United States Patent
Liao

(10) Patent No.: US 9,310,590 B1
(45) Date of Patent: Apr. 12, 2016

(54) FIVE-PIECE LENS ASSEMBLY FOR CAPTURING IMAGES

(71) Applicant: ABILITY OPTO-ELECTRONICS TECHNOLOGY CO.LTD., Taichung (TW)

(72) Inventor: Kuo-Yu Liao, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

(21) Appl. No.: 14/658,771

(22) Filed: Mar. 16, 2015

(30) Foreign Application Priority Data

Nov. 18, 2014 (TW) .............................. 103139863 A

(51) Int. Cl.
*G02B 13/04* (2006.01)
*G02B 9/60* (2006.01)
*G02B 13/18* (2006.01)

(52) U.S. Cl.
CPC ...................................... *G02B 13/18* (2013.01)

(58) Field of Classification Search
CPC ............................... G02B 13/0045; G02B 9/60
USPC ........................... 359/713, 714, 763, 764, 765
See application file for complete search history.

(56) References Cited

U.S. PATENT DOCUMENTS

| 8,873,165 | B1* | 10/2014 | Chung | G02B 13/0045 359/714 |
| 8,976,462 | B2* | 3/2015 | Ohtsu | G02B 9/60 348/340 |
| 2012/0212660 | A1* | 8/2012 | Tang | G02B 13/0045 348/345 |
| 2015/0015971 | A1* | 1/2015 | Huang | G02B 9/62 359/713 |
| 2015/0109691 | A1* | 4/2015 | Ota | G02B 9/62 359/756 |

* cited by examiner

*Primary Examiner* — Scott J Sugarman
(74) *Attorney, Agent, or Firm* — Muncy, Geissler, Olds & Lowe, P.C.

(57) ABSTRACT

The invention discloses a five-piece lens assembly for capturing image. It includes a first lens element with positive refractive power having a convex image-side surface and a convex object-side surface. A second lens element has a concave image-side surface. At least one of the image-side surface and the object-side surface of the first lens element and the second lens element is aspheric. An object-side surface and an image-side surface of the third lens element are aspheric and have inflection points. A fourth lens element has a concave object-side surface and a convex image-side surface. A fifth lens element has a concave object-side surface and a convex image-side surface, and both of the two surfaces are aspheric. The object-side surface of the fifth lens element has at least one inflection point and the image-side surface has at least two inflection points. The second through fifth lens elements have refractive power.

20 Claims, 15 Drawing Sheets

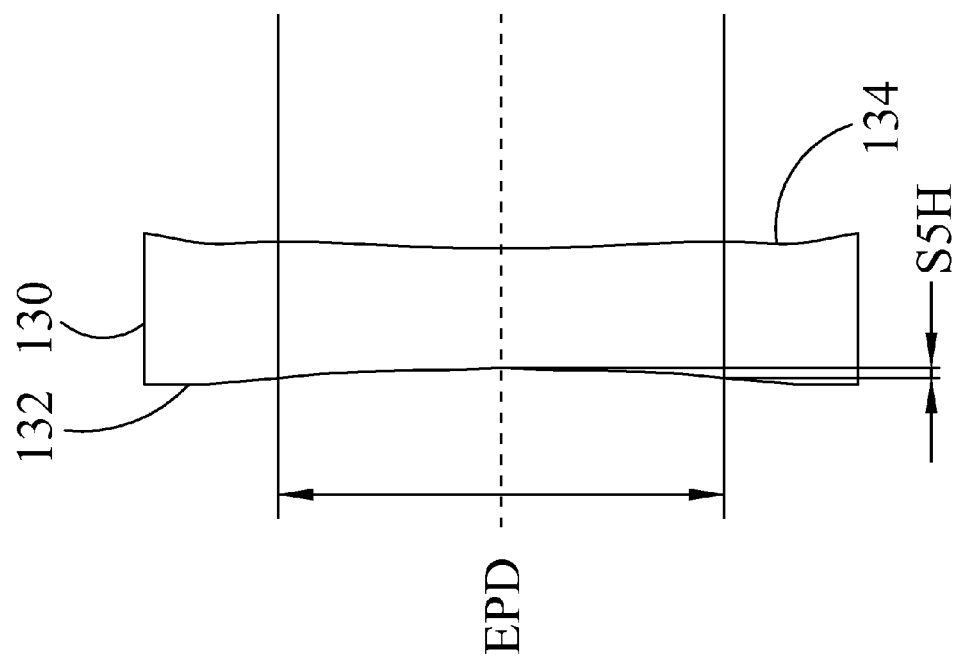

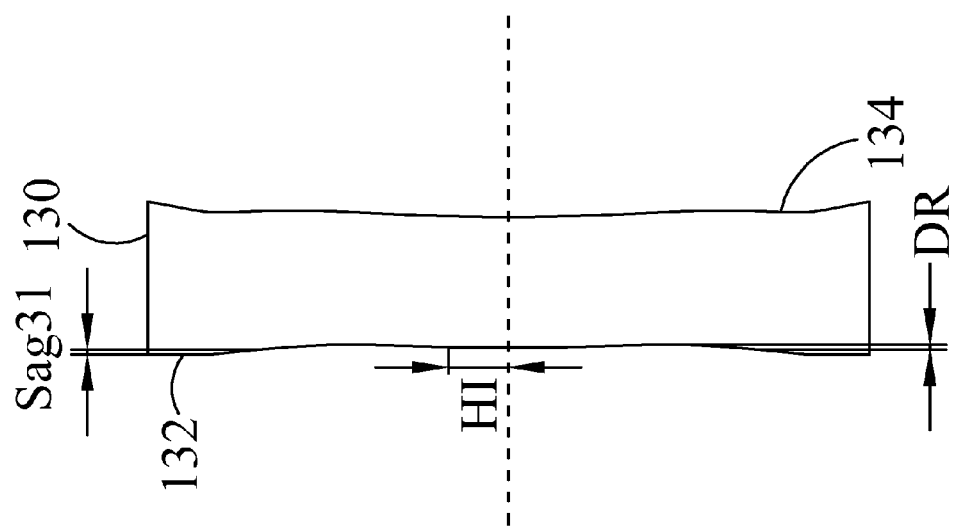

FIVE-PIECE LENS ASSEMBLY FOR CAPTURING IMAGES

CROSS-REFERENCE TO RELATED APPLICATION

This application claims priority from Taiwan Patent Application No. 103139863, filed on Nov. 18, 2014, in the Taiwan Intellectual Property Office, the content of which are hereby incorporated by reference in their entirety for all purposes.

BACKGROUND OF THE INVENTION

1. Field of the Invention

The following description relates to an optical lens assembly for capturing images, and more particularly with respect to a five-piece optical lens assembly for capturing images and is applicable to be applied to electronic products.

2. Description of the Related Art

In recent years, with the rise of electronic devices having camera functionalities, the demand for an optical lens for capturing images is raised gradually. The image sensing device of but ordinary photographing camera is commonly selected from charge coupled device (CCD) or is complementary metal oxide semiconductor sensor letter (CMOS), and with the burgeoning development of semiconductor manufacturing process, pixel size of charge coupled device shortens, and the optical image capturing system is directed towards the development of the field of high pixel, and thus, needs for imaging quality increase.

In all compact optical lens designs of five-piece lens fixing focus, prior arts combines lens with positive refractive power or negative refractive power. For example, by arranging a fourth lens element with negative refractive power and a fifth lens element with negative refractive power, a back focus and a total length of a captured optical image can be enhanced, but a total length of the optical lens system is hard to be shorten easily.

As a result, how to reduce the total length of optical lens for capturing image and effectively combine sets of lenses so as to further improve the imaging quality become an extremely crucial issue.

SUMMARY OF THE INVENTION

Aspects of embodiments of the present invention aim to a five-piece optical image capturing lens which is able to use a combination of five lenses having refractive power, inflection point, and convex and concave surfaces, so that the total length of the optical image capturing lens can be shorten effectively and the image quality can be improved.

The purpose of the present invention is to provide an five-piece lens assembly for capturing images, in order from an object side toward an image side along an optical axis comprising: a first lens element with positive refractive power having a convex image-side surface and a convex object-side surface adjacent to the optical axis, and at least one of the image-side surface and the object-side surface of the first lens element being aspheric; a second lens element with refractive power having a concave image-side surface adjacent to the optical axis, and at least one of the image-side surface and the object-side surface of the second lens element being aspheric; a third lens element with refractive power, an image-side surface and an object-side surface of the third lens element being aspheric, and both of the object-side surface and the image-side surface of the third lens element having inflection points; a fourth lens element with refractive power having a concave object-side surface and a convex image-side surface adjacent to the optical axis; a fifth lens element with refractive power having a concave object-side surface and a convex image-side surface adjacent to the optical axis, the image-side surface and the object-side surface of the fifth lens element being aspheric, and the object-side surface of the fifth lens element having at least one inflection point and the image-side surface of the fifth lens element having at least two inflection points; wherein focal lengths from the first through fifth lens elements are f1, f2, f3, f4, and f5, respectively, a focal length of the five-piece lens assembly for capturing images is f, a distance between the image-side surface of the fourth lens element and the object-side surface of the fifth lens element on the optical axis is T45, and they are satisfied with following condition:

$$1.3 \leq |f/f1| \leq 2.0, \ 0.13 < T45/f < 0.23.$$

Preferably, the third lens element has a convex object-side surface and a concave image-side surface adjacent to the optical axis.

Preferably, an aspheric area on the object-side surface of the third lens element takes the optical axis as a center and its diameter is less than an entrance pupil diameter EPD, a distance between a most prominent point perpendicular to a point of the optical axis and a most depressed point perpendicular to a point of the optical axis is less than 0.2 mm.

Preferably, a distance perpendicular to the optical axis between an inflection point on the object-side surface of the third lens element which is nearest to the optical axis and the optical axis is HI, and it is satisfied with following relation: 0 mm≤HI≤0.5 mm.

Preferably, a reference point is a perpendicular projection of the inflection point onto the optical axis, a distance in parallel with the optical axis from the reference point to an axial point on the object-side surface of the third lens element is DR, and it is satisfied with following relation:

$$0 \text{ mm} \leq DR \leq 0.15 \text{ mm}.$$

Preferably, a distance in parallel with the optical axis from the axial point to a maximum effective diameter position on the object-side surface of the third lens element is Sag31, a central thickness of the third lens element on the optical axis is CT3, and it is satisfied with following relation:

$$0 \leq |Sag31|/CT3 \leq 0.2.$$

Preferably, a distance between the image-side surface of the first lens element and the object-side surface of the second lens element on the optical axis is T12, and it is satisfied with following relation:

$$0 \leq T12/f \leq 0.1.$$

Preferably, a distance between the first lens element and the second lens element on the optical axis is T12, a central thickness of the first lens element on the optical axis is CT1, a central thickness of the second lens element on the optical axis is CT2, and it is satisfied with following relation:

$$0.3 \leq (CT2+T12)/CT1 \leq 0.7.$$

Preferably, the object-side surface of the second lens elements has at least one inflection point.

The purpose of the present invention is to provide another five-piece lens assembly for capturing images, in order from an object side toward an image side along an optical axis comprising: a first lens element with positive refractive power having a convex object-side surface adjacent to the optical axis, and at least one of the image-side surface and the object-side surface of the first lens element being aspheric; a second lens element with refractive power having a concave image-side surface adjacent to the optical axis, and at least one of the image-side surface and the object-side surface of the second lens element being aspheric; a third lens element with refractive power, an image-side surface and an object-side surface of the third lens element being aspheric, and both of the object-side surface and the image-side surface of the third lens element having inflection points; a fourth lens element with refractive power having a concave object-side surface and a convex image-side surface adjacent to the optical axis; a fifth lens element with refractive power, an image-side surface and an object-side surface of the fifth lens element being aspheric, and the object-side surface of the fifth lens element having at least one inflection point and the image-side surface of the fifth lens element having at least two inflection points. Focal lengths from the first through fifth lens elements are f1, f2, f3, f4, and f5, respectively, a focal length of the five-piece lens assembly for capturing images is f, a distance between the image-side surface of the fourth lens element and the object-side surface of the fifth lens element on the optical axis is T45, and they are satisfied with following condition:

$$1.323 \leq |f/f1| \leq 2.0, \ 0.13 < T45/f < 0.23.$$

Preferably, the image-side surface of the third lens has one critical point crossing with a tangent plane vertical to the optical axis.

Preferably, an aspheric area on the object-side surface of the third lens element takes the optical axis as a center and its diameter is less than an entrance pupil diameter EPD, a distance between a most prominent point perpendicular to a point of the optical axis and a most depressed point perpendicular to a point of the optical axis is less than 0.2 mm.

Preferably, a distance perpendicular to the optical axis between an inflection point on the object-side surface of the third lens element which is nearest to the optical axis and the optical axis is HI, and it is satisfied with following relation: 0 mm ≤ HI ≤ 0.5 mm.

Preferably, a reference point is a perpendicular projection of the inflection point onto the optical axis, a distance in parallel with the optical axis from the reference point to an axial point on the object-side surface of the third lens element is DR, and it is satisfied with following relation:

$$0 \ mm \leq DR \leq 0.15 \ mm.$$

Preferably, a distance in parallel with the optical axis from the axial point to a maximum effective diameter position on the object-side surface of the third lens element is Sag31, a central thickness of the third lens element on the optical axis is CT3, and it is satisfied with following relation:

$$0 \leq |Sag31|/CT3 \leq 0.2.$$

Preferably, a value of the aperture stop of the five-piece lens assembly for capturing images is F, and it is satisfied with following relation:

$$1.5 \leq F \leq 2.9.$$

Preferably, the image-side surface of the fifth lens has one critical point crossing with a tangent plane vertical to the optical axis, a distance perpendicular to the optical axis between the critical point and the optical axis is DC, the entrance pupil diameter is EPD, and it is satisfied with following relation:

$$0.5 \leq DC/EPD \leq 1.$$

The purpose of the present invention is to provide another five-piece lens assembly for capturing images, in order from an object side toward an image side along an optical axis comprising: a first lens element with positive refractive power having a convex object-side surface adjacent to the optical axis, and at least one of the image-side surface and the object-side surface of the first lens element being aspheric; a second lens element with refractive power having a concave image-side surface adjacent to the optical axis, and at least one of the image-side surface and the object-side surface of the second lens element being aspheric; a third lens element with refractive power, an image-side surface and an object-side surface of the third lens element being aspheric, and both of the object-side surface and the image-side surface of the third lens element having inflection points; a fourth lens element with refractive power having a concave object-side surface and a convex image-side surface adjacent to the optical axis; a fifth lens element with refractive power, an image-side surface and an object-side surface of the fifth lens element being aspheric, and the object-side surface of the fifth lens element having at least one inflection point and the image-side surface of the fifth lens element having at least two inflection points. Focal lengths from the first through fifth lens elements are f1, f2, f3, f4, and f5, respectively, a focal length of the five-piece lens assembly for capturing images is f, a distance between the object-side surface of the first lens element and an image plane on the optical axis is OT, and they are satisfied with following condition:

$$1.3 \leq |f/f1| \leq 2.0, \ OT < 3.5 \ mm.$$

Preferably, an aspheric area on the object-side surface of the third lens element takes the optical axis as a center and its diameter is less than an entrance pupil diameter EPD, a distance between a most prominent point perpendicular to a point of the optical axis and a most depressed point perpendicular to a point of the optical axis is less than 0.2 mm.

Preferably, a distance perpendicular to the optical axis between an inflection point on the object-side surface of the third lens element which is nearest to the optical axis and the optical axis is HI and it is satisfied with following relation:

$$0 \ mm \leq HI \leq 0.5 \ mm.$$

BRIEF DESCRIPTION OF THE DRAWINGS

Hereinafter, embodiments of the present invention will be described in detail with reference to the accompanying drawings so that those skilled in the art to which the present invention pertains can realize the present invention, wherein:

FIGS. 1A, 1B and 1C are schematic diagrams of related parameters of a five-piece lens assembly for capturing images according to the present invention.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1C:
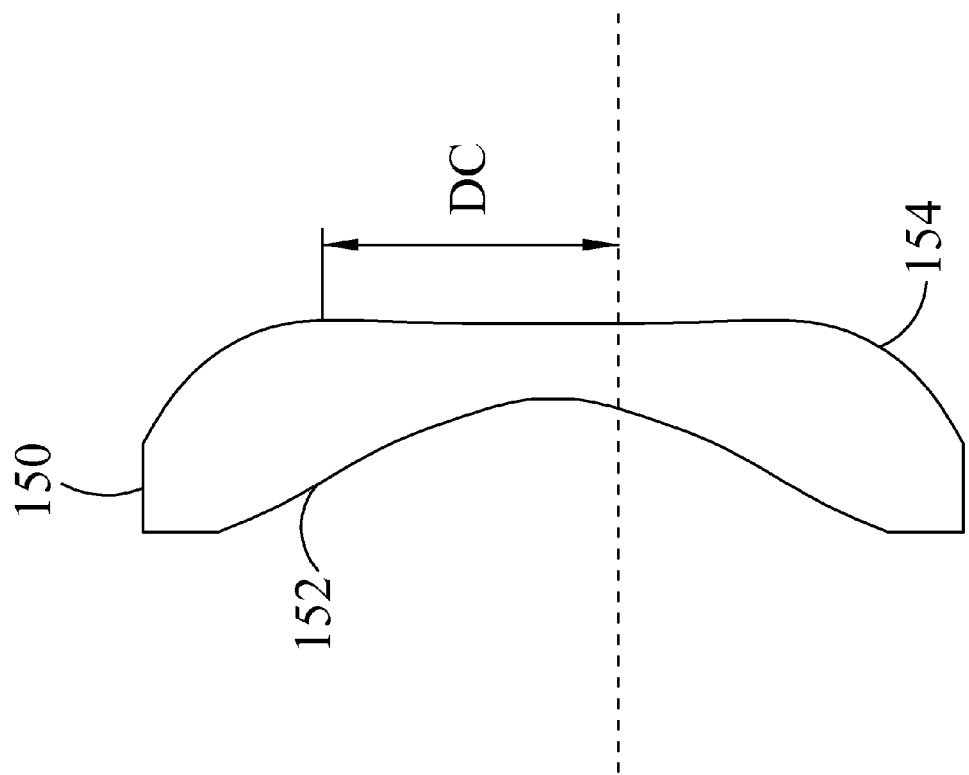

Please refer to FIGS. 1A, 1B and 1C which are schematic diagrams of related parameters of a five-piece lens assembly for capturing images according to the present invention. As FIG. 1A shows, an aspheric area on the object-side surface 132 of the third lens element 130 takes the optical axis as a center and its diameter is less than an entrance pupil diameter EPD, a distance between a most prominent point perpendicular to a point of the optical axis and a most depressed point perpendicular to a point of the optical axis is S5H. The application of S5H will be employed in the following embodiments. As FIG. 1B shows, a distance perpendicular to the optical axis between an inflection point on the object-side surface 132 of the third lens element 130 which is nearest to the optical axis and the optical axis is HI; a reference point is a perpendicular projection of the inflection point onto the optical axis, and a distance in parallel with the optical axis from the reference point to an axial point on the object-side surface 132 of the third lens element 130 is DR; a distance in parallel with the optical axis from the axial point to a maximum effective diameter position on the object-side surface 132 of the third lens element 130 is Sag31. As FIG. 1C shows, the image-side surface 154 of the fifth lens element 150 has one critical point crossing with a tangent plane vertical to the optical axis, and a distance perpendicular to the optical axis between the critical point and the optical axis is DC. Therefore, FIGS. 1A, 1B and 1C are used to explain herein.

Figure 2A:
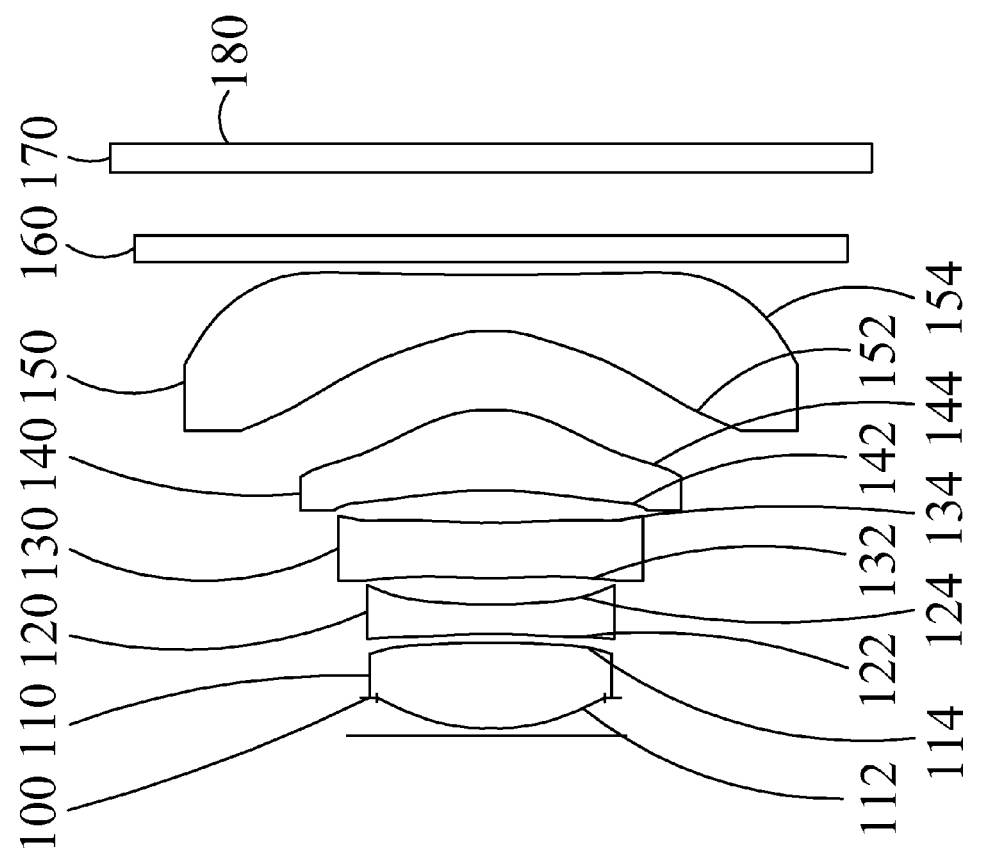
FIG. 2A is a schematic view of the five-piece lens assembly for capturing image according to a first embodiment of the present application.

Referring to FIG. 2A, FIG. 2A is a schematic view of a five-piece lens assembly for capturing image according to a first embodiment of the present application. As shown in FIG. 2A, the disclosure includes a lens assembly for capturing images, that in order from object side toward an image side along an optical axis comprising: a first lens element 110, a second lens element 120, a third lens element 130, a fourth lens element 140, and a fifth lens element 150.

The first lens element has positive refractive power, an object-side surface 112 and an image-side surface 114 of the first lens element 110 adjacent to the optical axis are convex, and at least one of the object-side surface 112 and the image-side surface 114 may be aspheric. The second lens element 120 has refractive power, an image-side surface 124 of the second lens element 120 adjacent to the optical axis is concave, and at least one of the object-side surface 122 and the image-side surface 124 of the second lens element may be aspheric. The third lens element 130 has refractive power, an object-side surface 132 of the third lens element 130 adjacent to the optical axis is convex and an image-side surface 134 of the third lens element 130 adjacent to the optical axis is concave. The object-side surface 132 and the image-side surface 134 of the third lens element are aspheric and have inflection points. The fourth lens element 140 has refractive power, and an object-side surface 142 and an image-side surface 144 of the fourth lens element 140 are concave and convex, respectively. The fifth lens element 150 has refractive power, an object-side surface 152 of the fifth lens element 150 adjacent to the optical axis is concave and an image-side surface 154 of the fifth lens element 150 adjacent to the optical axis is convex. The object-side surface 152 and the image-side surface 154 of the fifth lens element are aspheric, the object-side surface 152 has at least one inflection point and the image-side surface 154 has at least two inflection points.

The optical surface of the present disclosure can be made in a shape not sphere, to obtain more control variables for decreasing aberration, and the better resolution capability and compactness of lenses can be provided and the total length of lenses can be reduced efficiently.

The five-piece lens assembly for capturing image of the present invention further comprises an aperture stop 100 and an IR-bandstop filter 160. The aperture stop 100 is between a photographed object and the first lens element 110, and the IR-bandstop filter 160 is between the fifth lens element 150 and an image plane 180. The IR-bandstop filter 160 is generally made of panel glass without affecting the focal length of the five-piece lens assembly of the invention.

The five-piece lens assembly for capturing image of the invention further comprises an image sensing device 190 on the image plane 180 for imaging an object to be imaged. The first through fifth lens element comprise a plastic material or a glass material, and the aspheric surface formula as given in following equation:

$$z = ch^2/[1+[1-(k+1)c^2h^2]^{0.5}] + Ah^4 + Bh^6 + Ch^8 + Dh^{10} + Eh^{12} + Fh^{14} + Gh^{16} + Hh^{18} + Jh^{20} + \ldots, \quad (1).$$

Where z is the position value of the position along the optical axis and at the height of h with reference to the surface apex, k is the conic coefficient, c is the reciprocal of curvature radius, and A, B, C, D, E, F, G, H, and J are high-order aspheric coefficient.

The detailed optical data of the first embodiment is shown in table 1, and the object-side surfaces and the image-side surfaces of the first through fifth lens element are made according to the equation (1), and their aspheric parameters are shown in table 2. A focus length f1 of the first lens element 110 is 2.234 mm. A focal length f of the five-piece lens assembly for capturing images is 3.535 mm. A distance T45 between the image-side surface 144 of the fourth lens element and the object-side surface 152 of the fifth lens element on the optical axis is 0.633 mm. A value of the aperture stop (F-number) of the five-piece lens assembly for capturing images is F=2.034. The entrance pupil diameter EPD is 1.738 mm. A distance OT between the object-side surface 112 and image plane 180 on the optical axis is 4.44 mm. A distance T12 between the first lens element 110 and the second lens element 120 on the optical axis is 0.0678 mm. A central thickness of the first lens element 110 on the optical axis is 0.681 mm. A central thickness of the second lens element 120 on the optical axis is 0.235 mm. A central thickness CT3 of the third lens element 130 on the optical axis is 0.44 mm. The distance S5H is less than 0.2 mm.

A distance perpendicular to the optical axis between an inflection point on the object-side surface 132 of the third lens element 130 which is nearest to the optical axis and the optical axis is HI=0.281 mm, a reference point is a perpendicular projection of the inflection point onto the optical axis, and a distance in parallel with the optical axis from the reference point to an axial point on the object-side surface 132 of the third lens element 130 is DR=0.0072 mm. A distance in parallel with the optical axis from the axial point to a maximum effective diameter position on the object-side surface 132 of the third lens element 130 is Sag31=−0.0220 mm. The image-side surface 154 of the fifth lens element 150 has one critical point crossing with a tangent plane vertical to the optical axis, and a distance perpendicular to the optical axis between the critical point and the optical axis is DC=1.196 mm.

According to above description, |f/f1|=1.582 is satisfied with 1.3≤|f/f1|≤2.0, T45/f=0.179 is satisfied with 0.13<T45/f<0.23, |Sag31|/CT3=0.0500 is satisfied with 0≤|Sag31|/CT3≤0.2, T12/f=0.0192 is satisfied with 0≤T12/f≤0.1, (CT2+T12)/CT1=0.445 is satisfied with 0.3≤(CT2+T12)/CT1≤0.7, DC/EPD=0.688 is satisfied with 0.5≤DC/EPD≤1, and HI=0.281 mm is satisfied with 0 mm≤HI≤0.5 mm.

TABLE 1

Basic lens element data of the first embodiment

| Surface# | | Curvature radius (mm) | Thickness (mm) | Index (Nd) | Abbe# (Vd) | Focal length (mm) |
|---|---|---|---|---|---|---|
| Aperture stop | | ∞ | −0.242 | | | |
| First lens element | First Surface | 1.586 | 0.681 | 1.544 | 56.09 | 2.234 |
| | Second Surface | −4.482 | 0.068 | | | |
| Second lens element | Third Surface | −3.698 | 0.235 | 1.636 | 23.89 | −3.166 |
| | Fourth Surface | 4.599 | 0.214 | | | |
| Third lens element | Fifth Surface | 4.520 | 0.440 | 1.642 | 22.46 | 27.724 |
| | Sixth Surface | 5.810 | 0.258 | | | |
| Fourth lens element | Seventh Surface | −3.109 | 0.641 | 1.544 | 56.09 | 2.459 |
| | Eighth Surface | −1.006 | 0.632 | | | |
| Fifth lens element | Ninth Surface | −0.959 | 0.452 | 1.514 | 56.84 | −2.131 |
| | Tenth Surface | −8.630 | 0.103 | | | |
| Filter | Eleventh Surface | ∞ | 0.21 | 1.517 | 64.17 | |
| | Twelfth Surface | ∞ | 0.505 | | | |

TABLE 2

Aspheric coefficients of the first embodiment

| | Surface # | | | | |
|---|---|---|---|---|---|
| | 1 | 2 | 3 | 4 | 5 |
| k | 1.948 | 2.156 | 4.879 | −0.088 | −2.724 |
| A | −0.092 | 0.217 | 0.337 | 0.089 | −0.273 |
| B | 0.242 | −0.292 | −0.409 | −0.423 | 0.377 |
| C | −2.239 | −0.567 | −0.296 | 1.639 | −1.513 |
| D | 8.486 | 4.024 | 3.991 | −3.129 | 3.569 |
| E | −17.653 | −9.848 | −10.943 | 3.273 | −4.157 |
| F | 18.391 | 10.567 | 12.438 | −1.744 | 2.612 |
| G | −7.783 | −4.153 | −5.058 | 0.369 | −0.756 |

TABLE 2-continued

Aspheric coefficients of the first embodiment

| | Surface # | | | | |
|---|---|---|---|---|---|
| H | 0 | 0 | 0 | 0 | 0 |
| J | 0 | 0 | 0 | 0 | 0 |

| | Surface # | | | | |
|---|---|---|---|---|---|
| | 6 | 7 | 8 | 9 | 10 |
| k | −3.722 | −69.802 | −0.632 | −2.959 | 11.671 |
| A | −0.134 | −0.309 | 0.155 | 0.213 | 0.177 |
| B | 0.304 | 0.962 | −0.034 | −0.216 | −0.160 |
| C | −0.900 | −1.323 | 0.246 | 0.090 | 0.077 |
| D | 1.479 | 1.028 | −0.261 | −0.015 | −0.024 |
| E | −1.380 | −0.488 | 0.121 | $9.725*10^{-4}$ | $4.441*10^{-3}$ |
| F | 0.737 | 0.137 | −0.027 | $6.681*10^{-4}$ | 0 |
| G | −0.171 | −0.020 | $2.587*10^{-3}$ | 0 | 0 |
| H | 0 | 0 | 0 | 0 | 0 |
| J | 0 | 0 | 0 | 0 | 0 |

Figure 2B:
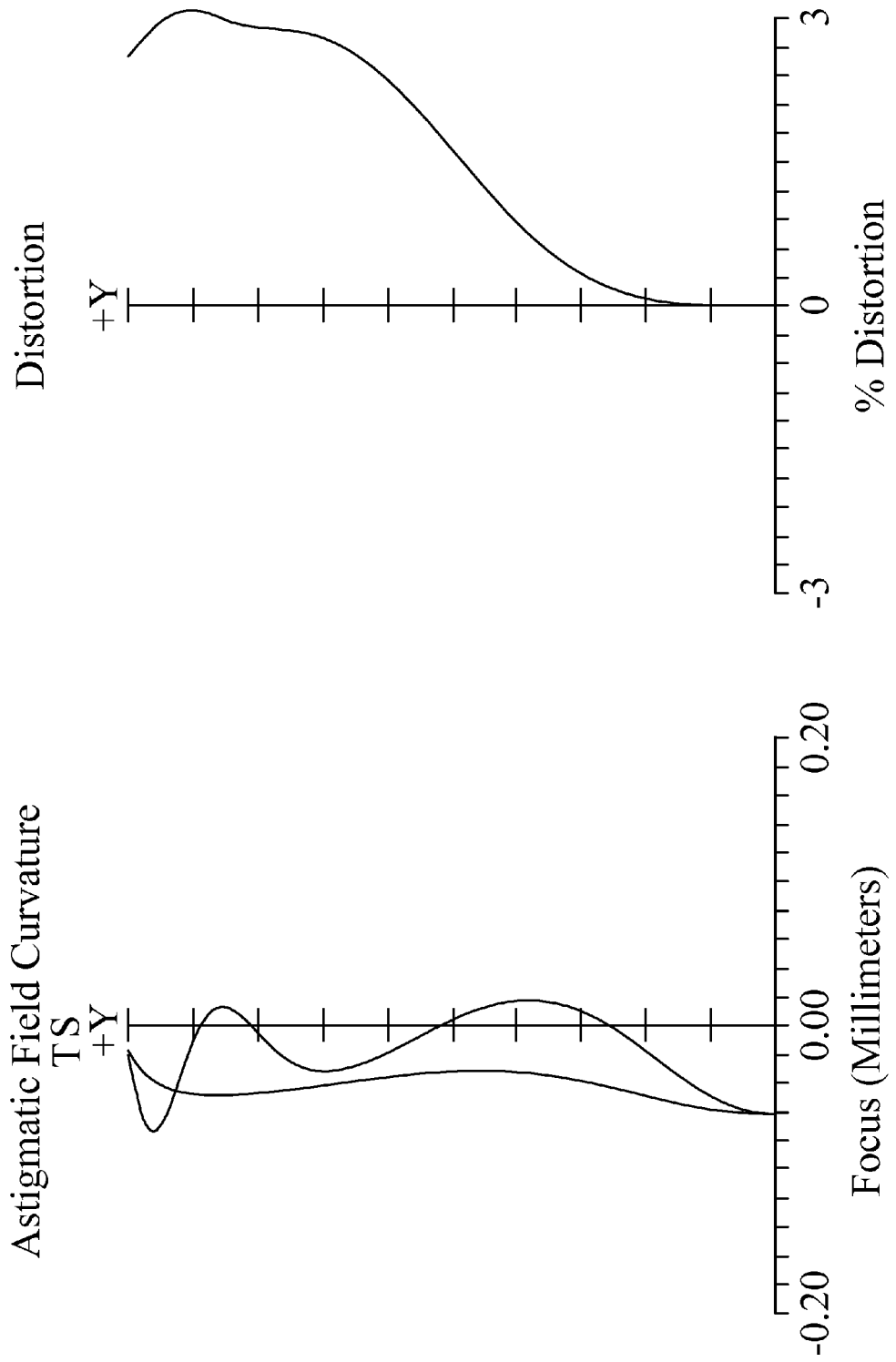
FIG. 2B is astigmatic field curves and a distortion curve according to the first embodiment of the present application.
Figure 2C:
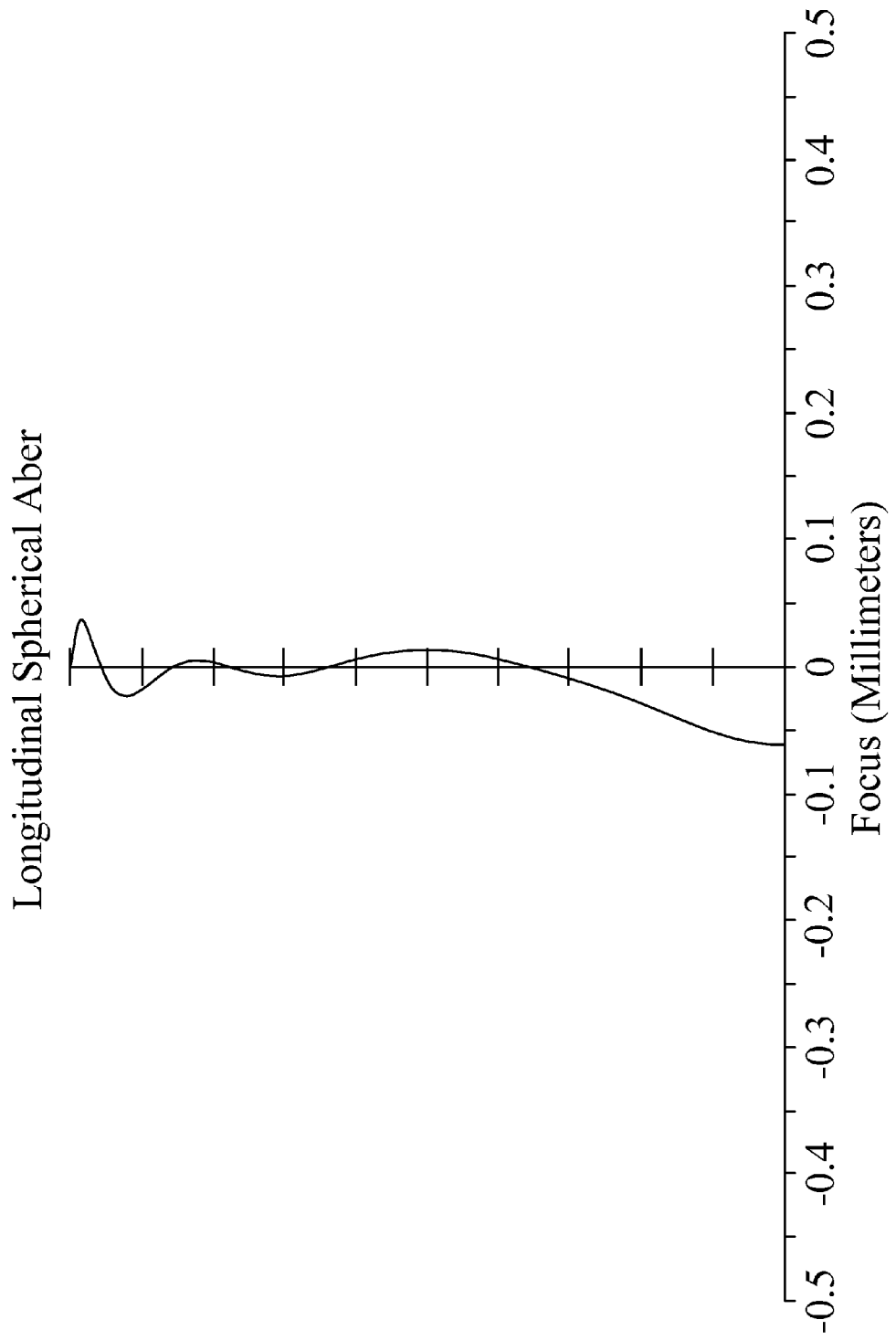
FIG. 2C is longitudinal spherical aberration curves according to the first embodiment of the present application.

It can be found by the basic lens element data of table 1 along with the curve diagram of aberration of FIG. 2B that it has better compensation effect upon the astigmatic field curves, the distortion curves and the longitudinal spherical aberration curves by the embodiment of the five-piece lens assembly for capturing images according to the present invention.

Figure 3A:
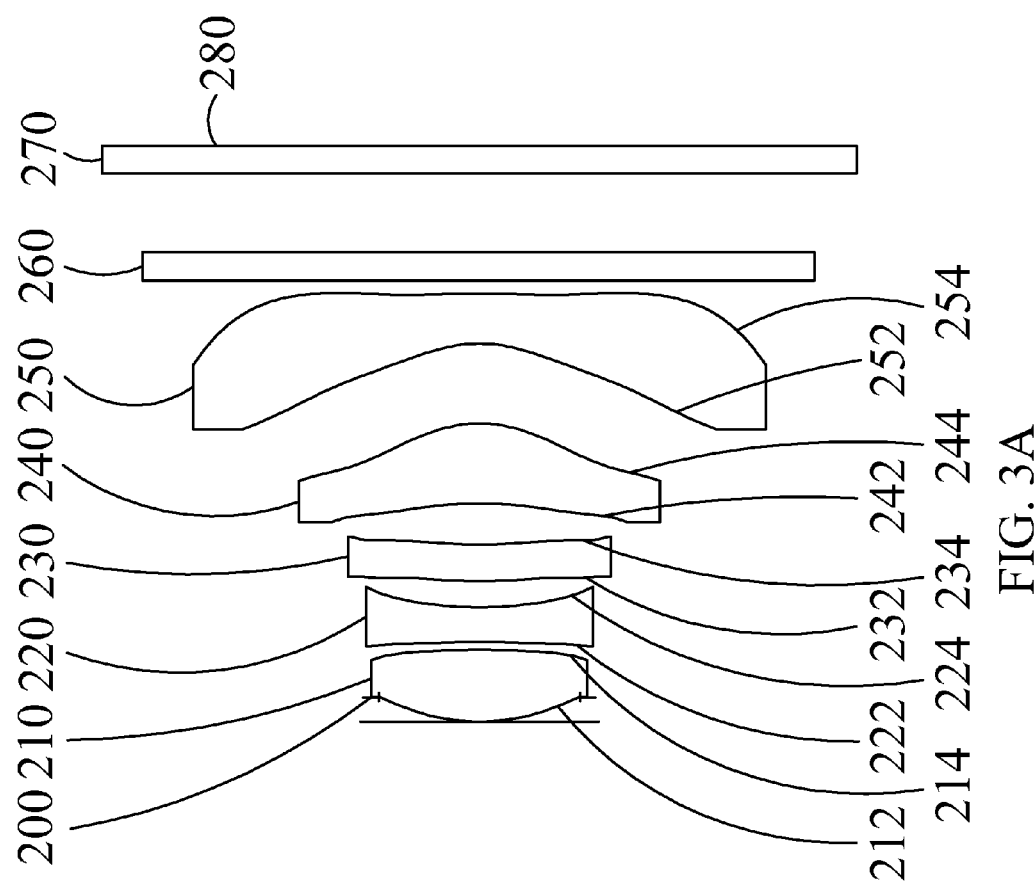
FIG. 3A is a schematic view of the five-piece lens assembly for capturing image according to a second embodiment of the present application.

Referring to FIG. 3A, FIG. 3A is a schematic view of a five-piece lens assembly for capturing image according to a second embodiment of the present application. As shown in FIG. 3A, the disclosure includes a lens assembly for capturing images, that in order from object side toward an image side along an optical axis comprising: a first lens element 210, a second lens element 220, a third lens element 230, a fourth lens element 240, and a fifth lens element 250, where all of the object-side and the image-side surfaces of the first 210 through fifth lens element 250 are consisted of the aspheric formulas (1), and the aspheric coefficients are shown in Table 4. The lens structure of the second embodiment is similar with the ones of the first embodiment, so we will not go further on this issue here.

In the second embodiment, a focus length f1 of the first lens element 210 is 1.718 mm, a focal length f of the five-piece lens assembly for capturing images is 2.854 mm. a distance T45 between the image-side surface 244 of the fourth lens element and the object-side surface 252 of the fifth lens element on the optical axis is 0.494 mm, a value of the aperture stop of the five-piece lens assembly for capturing images is F=2.344, the entrance pupil diameter EPD is 1.217 mm, a distance OT between the object-side surface 212 and image plane 280 on the optical axis is 3.40 mm, a distance T12 between the first lens element 210 and the second lens element 220 on the optical axis is 0.0514 mm, a central thickness of the first lens element 210 on the optical axis is 0.443 mm, a central thickness of the second lens element 220 on the optical axis is 0.215 mm, and a central thickness CT3 of the third lens element 230 on the optical axis is 0.228 mm, and the distance S5H is less than 0.2 mm.

A distance perpendicular to the optical axis between an inflection point on the object-side surface 232 of the third lens element 230 which is nearest to the optical axis and the optical axis is HI=0.265 mm, a reference point is a perpendicular projection of the inflection point onto the optical axis, and a distance in parallel with the optical axis from the reference point to an axial point on the object-side surface 232 of the third lens element 230 is DR=0.0114 mm. A distance in parallel with the optical axis from the axial point to a maximum effective diameter position on the object-side surface 232 of the third lens element 230 is Sag31=0.0283 mm. The image-side surface 254 of the fifth lens element 250 has one critical point crossing with a tangent plane vertical to the optical axis, and a distance perpendicular to the optical axis between the critical point and the optical axis is DC=0.874 mm.

According to above description, |f/f1|=1.661 is satisfied with 1.3≤|f/f1|≤2.0, T45/f=0.173 is satisfied with 0.13<T45/f<0.23, |Sag31|/CT3=0.124 is satisfied with 0≤|Sag31|/CT3≤0.2, T12/f=0.0180 is satisfied with 0≤T12/f≤0.1, (CT2+T12)/CT1=0.600 is satisfied with 0.3≤(CT2+T12)/CT1≤0.7, DC/EPD=0.718 is satisfied with 0.5≤DC/EPD≤1, OT=3.40 mm is satisfied with OT<3.5 mm, and HI=0.265 mm is satisfied with 0 mm≤HI≤0.5 mm.

TABLE 3

Basic lens element data of the second embodiment

| Surface# | | Curvature radius (mm) | Thickness (mm) | Index (Nd) | Abbe# (Vd) | Focal length (mm) |
|---|---|---|---|---|---|---|
| Aperture stop | | ∞ | −0.152 | | | |
| First lens element | First Surface | 1.218 | 0.443 | 1.544 | 56.09 | 1.718 |
| | Second Surface | −3.551 | 0.051 | | | |
| Second lens element | Third Surface | −3.389 | 0.215 | 1.636 | 23.89 | −2.315 |
| | Fourth Surface | 2.700 | 0.160 | | | |
| Third lens element | Fifth Surface | 2.514 | 0.228 | 1.642 | 22.46 | 17.096 |
| | Sixth Surface | 3.136 | 0.253 | | | |
| Fourth lens element | Seventh Surface | −2.284 | 0.497 | 1.544 | 56.09 | 1.926 |
| | Eighth Surface | −0.775 | 0.494 | | | |
| Fifth lens element | Ninth Surface | −0.734 | 0.310 | 1.514 | 56.78 | −1.669 |
| | Tenth Surface | −5.742 | 0.080 | | | |
| Filter | Eleventh Surface | ∞ | 0.21 | 1.517 | 64.17 | |
| | Twelfth Surface | ∞ | 0.490 | | | |

TABLE 4

Aspheric coefficients of the second embodiment

| | Surface # | | | | |
|---|---|---|---|---|---|
| | 1 | 2 | 3 | 4 | 5 |
| k | 1.989 | 6.436 | 8.639 | 1.689 | −4.341 |
| A | −0.188 | 0.463 | 0.714 | 0.201 | −0.554 |
| B | 0.724 | −1.069 | −1.540 | −1.297 | 1.270 |
| C | −12.400 | −3.599 | −1.956 | 8.596 | −8.011 |
| D | 74.596 | 35.427 | 35.174 | −28.202 | 31.931 |
| E | −251.748 | −138.527 | −155.818 | 47.410 | −60.873 |
| F | 432.224 | 244.741 | 295.376 | −37.868 | 60.046 |
| G | −313.523 | −161.300 | −199.699 | 12.045 | −26.223 |
| H | 0 | 0 | 0 | 0 | 0 |
| J | 0 | 0 | 0 | 0 | 0 |

| | Surface # | | | | |
|---|---|---|---|---|---|
| | 6 | 7 | 8 | 9 | 10 |
| k | −6.801 | −70.653 | −0.615 | −2.939 | 1.520 |
| A | −0.324 | −0.657 | 0.358 | 0.490 | 0.362 |
| B | 0.959 | 3.217 | −0.088 | −0.754 | −0.536 |
| C | −4.865 | −7.212 | 1.335 | 0.500 | 0.415 |
| D | 13.357 | 9.122 | −2.321 | −0.125 | −0.207 |
| E | −19.388 | −6.989 | 1.722 | −0.018 | 0.064 |
| F | 17.561 | 3.153 | −0.621 | 0.015 | −0.011 |
| G | −7.836 | −0.750 | 0.096 | $-2.25*10^{-3}$ | $8.39*10^{-4}$ |
| H | 0 | 0 | 0 | 0 | 0 |
| J | 0 | 0 | 0 | 0 | 0 |

Figure 3B:
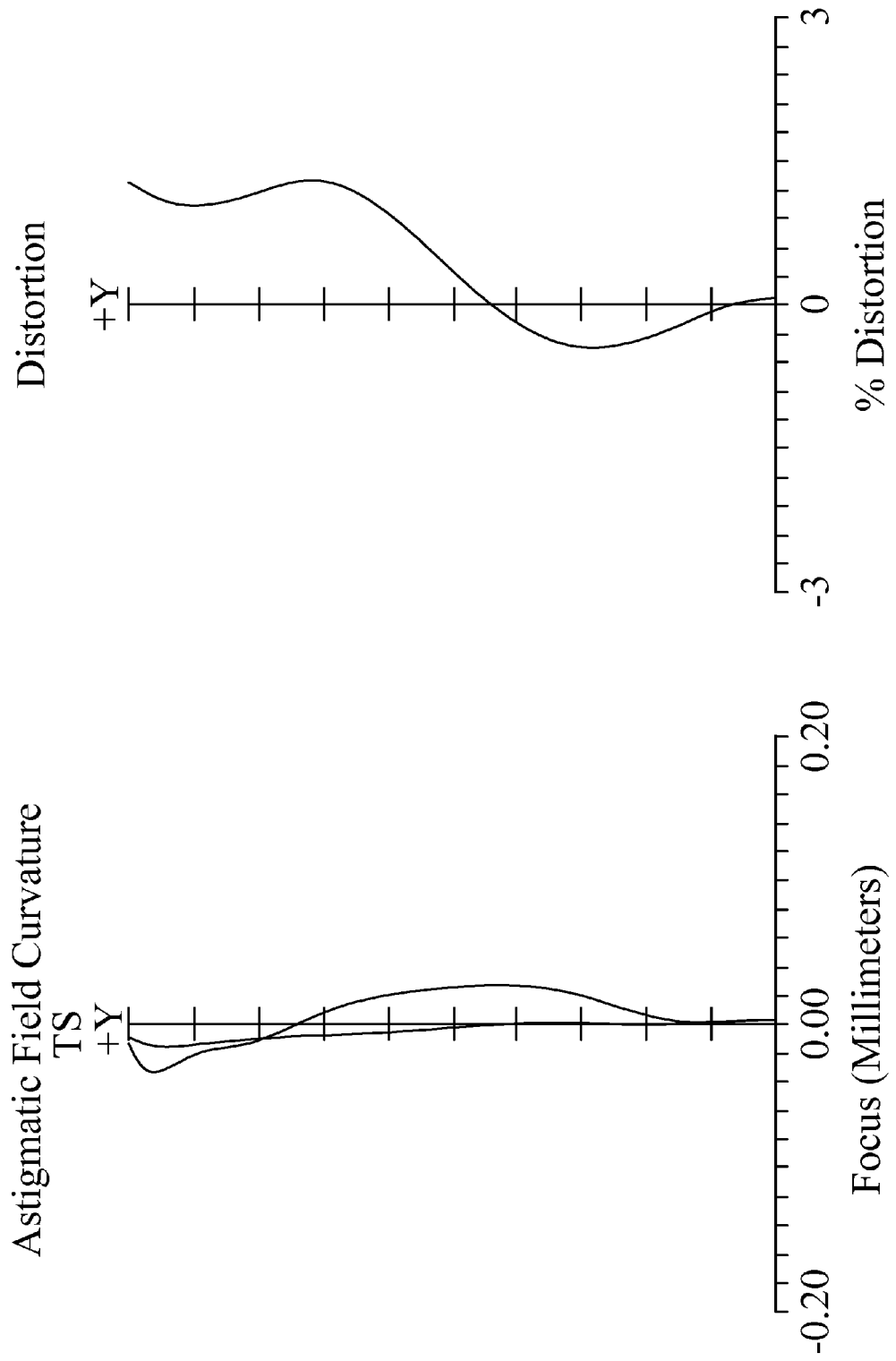
FIG. 3B is astigmatic field curves and a distortion curve according to the second embodiment of the present application.
Figure 3C:
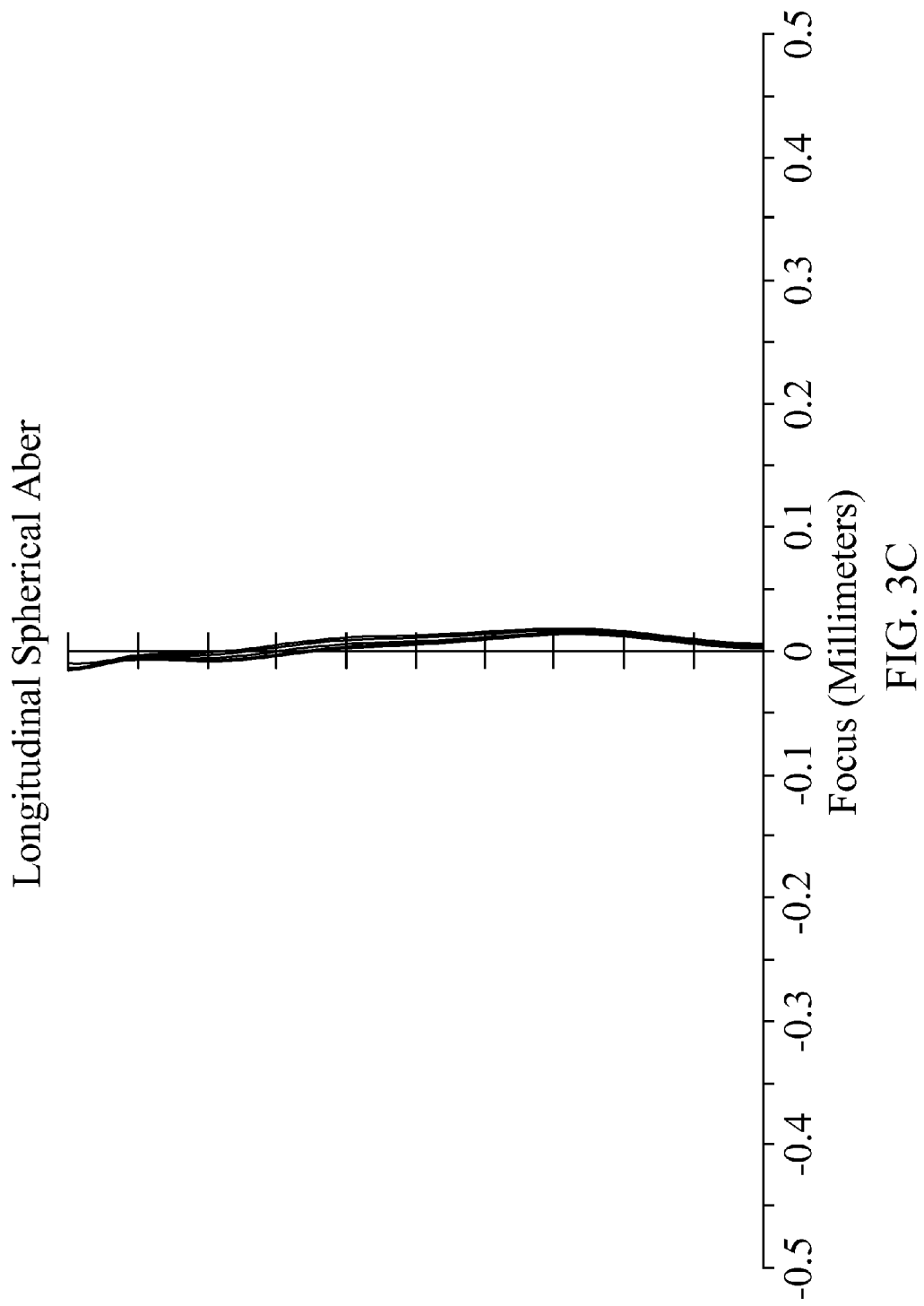
FIG. 3C is longitudinal spherical aberration curves according to the second embodiment of the present application.

It can be found by the basic lens element data of table 3 along with the curve diagram of aberration of FIG. 3B that it has better compensation effect upon the astigmatic field curves, the distortion curves and the longitudinal spherical aberration curves by the embodiment of the five-piece lens assembly for capturing images according to the present invention.

Figure 4A:
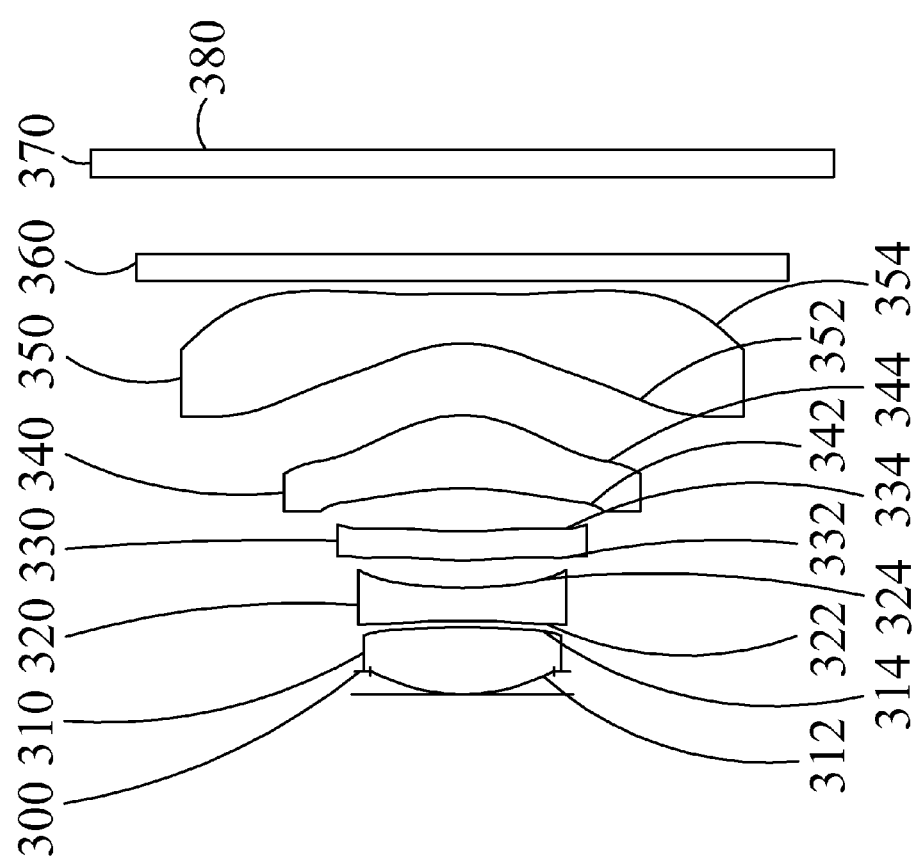
FIG. 4A is a schematic view of the five-piece lens assembly for capturing image according to a third embodiment of the present application.

Referring to FIG. 4A, FIG. 4A is a schematic view of a five-piece lens assembly for capturing image according to a third embodiment of the present application. As shown in FIG. 4A, the disclosure includes a lens assembly for capturing images, that in order from object side toward an image side along an optical axis comprising: a first lens element 310, a second lens element 320, a third lens element 330, a fourth lens element 340, and a fifth lens element 350, where all of the object-side and the image-side surfaces of the first 310 through fifth lens element 350 are consisted of the aspheric formulas (1), and the aspheric coefficients are shown in Table 6. The lens structure of the third embodiment is similar with the ones of the first embodiment, so we will not go further on this issue here.

In the third embodiment, a focus length f1 of the first lens element 310 is 2.018 mm, a focal length f of the five-piece lens assembly for capturing images is 3.405 mm, a distance T45 between the image-side surface 344 of the fourth lens element and the object-side surface 352 of the fifth lens element on the optical axis is 0.558 mm, a value of the aperture stop of the five-piece lens assembly for capturing images is F=2.4, the entrance pupil diameter EPD is 1.419 mm, a distance OT between the object-side surface 312 and image plane 380 on the optical axis is 4.02 mm, a distance T12 between the first lens element 310 and the second lens element 320 on the optical axis is 0.051 mm. a central thickness of the first lens element 310 on the optical axis is 0.521 mm, a central thickness of the second lens element 320 on the optical axis is 0.258 mm, and a central thickness CT3 of the third lens element 330 on the optical axis is 0.227 mm, and the distance S5H is less than 0.2 mm.

A distance perpendicular to the optical axis between an inflection point on the object-side surface 332 of the third lens element 330 which is nearest to the optical axis and the optical axis is HI=0.300 mm, a reference point is a perpendicular projection of the inflection point onto the optical axis, and a distance in parallel with the optical axis from the reference point to an axial point on the object-side surface 332 of the third lens element 330 is DR=0.0130 mm. A distance in parallel with the optical axis from the axial point to a maximum effective diameter position on the object-side surface 332 of the third lens element 330 is Sag31=0.0304 mm. The image-side surface 354 of the fifth lens element 350 has one critical point crossing with a tangent plane vertical to the optical axis, and a distance perpendicular to the optical axis between the critical point and the optical axis is DC=1.116 mm.

According to above description, |f/f1|=1.687 is satisfied with 1.3≤|f/f1|≤2.0, T45/f=0.164 is satisfied with 0.13<T45/f<0.23, |Sag31|/CT3=0.134 is satisfied with 0≤|Sag31|/

CT3≤0.2, T12/f=0.0150 is satisfied with 0≤T12/f≤0.1, (CT2+T12)/CT1=0.593 is satisfied with 0.3≤(CT2+T12)/CT1≤0.7, DC/EPD=0.786 is satisfied with 0.5≤DC/EPD≤1, HI=0.300 mm is satisfied with 0 mm≤HI≤0.5 mm.

TABLE 5

Basic lens element data of the third embodiment

| Surface# | | Curvature radius (mm) | Thickness (mm) | Index (Nd) | Abbe# (Vd) | Focal length (mm) |
|---|---|---|---|---|---|---|
| Aperture stop | | ∞ | −0.180 | | | |
| First lens element | First Surface | 1.417 | 0.521 | 1.544 | 56.09 | 2.018 |
| | Second Surface | −4.311 | 0.051 | | | |
| Second lens element | Third Surface | −3.643 | 0.258 | 1.636 | 23.89 | −2.795 |
| | Fourth Surface | 3.614 | 0.212 | | | |
| Third lens element | Fifth Surface | 2.838 | 0.227 | 1.544 | 56.09 | 19.344 |
| | Sixth Surface | 3.772 | 0.331 | | | |
| Fourth lens element | Seventh Surface | −2.659 | 0.569 | 1.544 | 56.09 | 2.316 |
| | Eighth Surface | −0.921 | 0.558 | | | |
| Fifth lens element | Ninth Surface | −0.897 | 0.390 | 1.515 | 56.84 | −1.938 |
| | Tenth Surface | −9.945 | 0.096 | | | |
| Filter | Eleventh Surface | ∞ | 0.21 | 1.517 | 64.17 | |
| | Twelfth Surface | ∞ | 0.596 | | | |

TABLE 6

Aspheric coefficients of the third embodiment

| | Surface # | | | | |
|---|---|---|---|---|---|
| | 1 | 2 | 3 | 4 | 5 |
| k | 1.939 | 2.863 | 5.864 | 3.621 | −12.272 |
| A | −0.122 | 0.266 | 0.416 | 0.135 | −0.330 |
| B | 0.338 | −0.360 | −0.578 | −0.537 | 0.501 |
| C | −3.530 | −1.197 | −0.699 | 2.354 | −2.219 |
| D | 14.262 | 6.568 | 6.640 | −5.357 | 6.234 |
| E | −33.804 | −18.062 | −20.474 | 6.566 | −8.151 |
| F | 41.396 | 24.646 | 29.461 | −3.849 | 5.517 |
| G | −21.823 | −12.939 | −15.552 | 0.954 | −1.679 |
| H | 0 | 0 | 0 | 0 | 0 |
| J | 0 | 0 | 0 | 0 | 0 |

| | Surface # | | | | |
|---|---|---|---|---|---|
| | 6 | 7 | 8 | 9 | 10 |
| k | −15.888 | −73.201 | −0.608 | −3.124 | −3.977 |
| A | −0.213 | −0.410 | 0.227 | 0.280 | 0.195 |
| B | 0.353 | 1.300 | −0.029 | −0.300 | −0.208 |
| C | −1.311 | −1.997 | 0.367 | 0.140 | 0.114 |
| D | 2.637 | 1.776 | −0.453 | −0.024 | −0.040 |
| E | −2.594 | −0.947 | 0.232 | $-2.443*10^{-3}$ | $8.637*10^{-3}$ |
| F | 1.613 | 0.273 | −0.057 | $1.425*10^{-3}$ | $-1.047*10^{-3}$ |
| G | −0.533 | −0.039 | $6.263*10^{-3}$ | 0 | 0 |
| H | 0 | 0 | 0 | 0 | 0 |
| J | 0 | 0 | 0 | 0 | 0 |

Figure 4B:
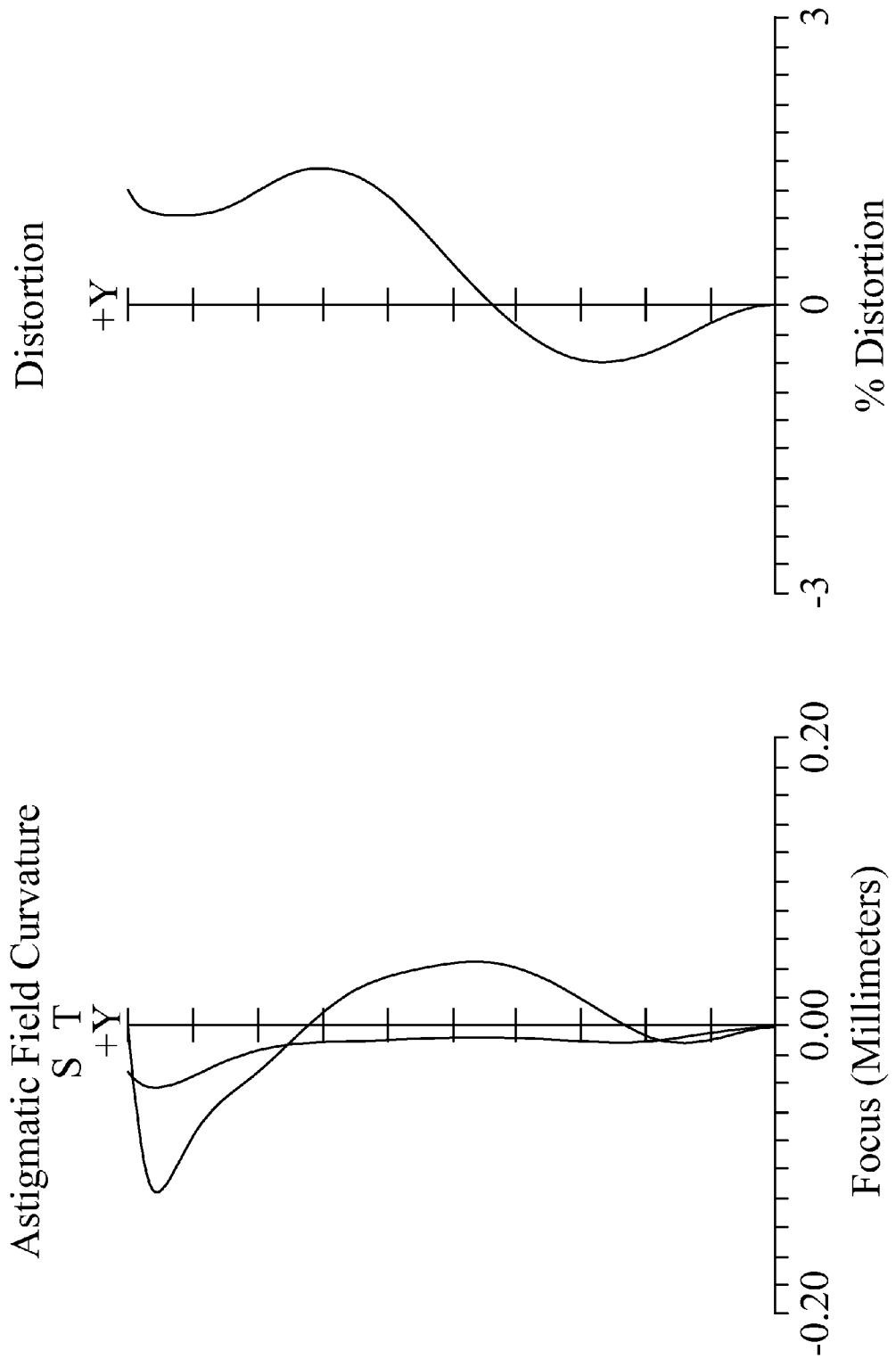
FIG. 4B is astigmatic field curves and a distortion curve according to the third embodiment of the present application.
Figure 4C:
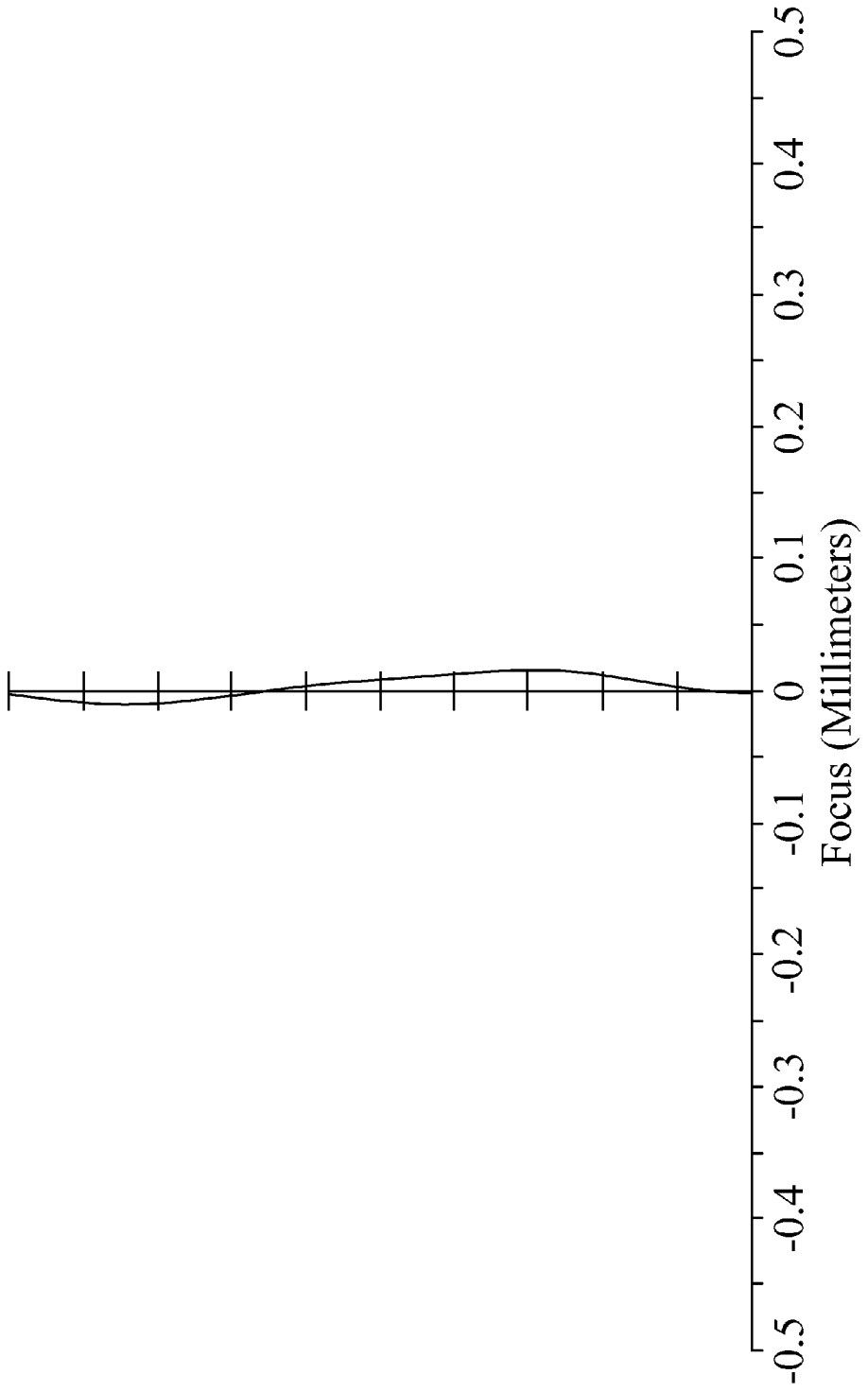
FIG. 4C is longitudinal spherical aberration curves according to the third embodiment of the present application.

It can be found by the basic lens element data of table 5 along with the curve diagram of aberration of FIG. 4B that it has better compensation effect upon the astigmatic field curves, the distortion curves and the longitudinal spherical aberration curves by the embodiment of the five-piece lens assembly for capturing images according to the present invention.

Figure 5A:
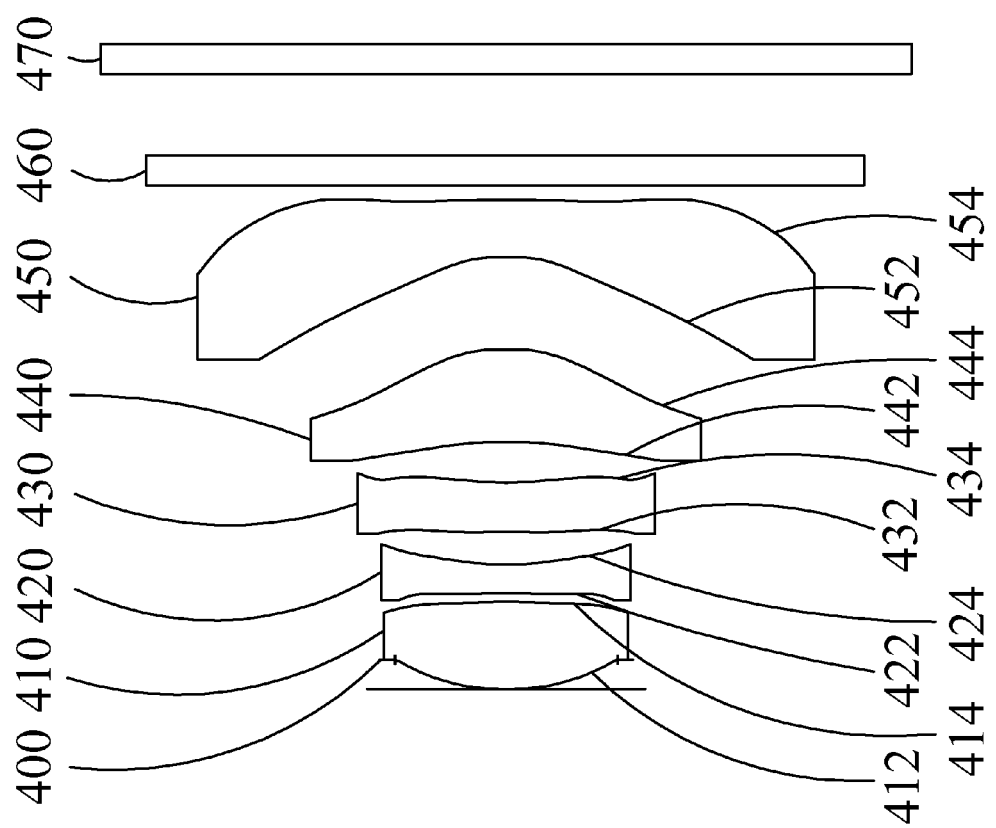
FIG. 5A is a schematic view of the five-piece lens assembly for capturing image according to a fourth embodiment of the present application.

Referring to FIG. 5A, FIG. 5A is a schematic view of a five-piece lens assembly for capturing image according to a fourth embodiment of the present application. As shown in FIG. 5A, the disclosure includes a lens assembly for capturing images, that in order from object side toward an image side along an optical axis comprising: a first lens element 410, a second lens element 420, a third lens element 430, a fourth lens element 440, and a fifth lens element 450, where all of the object-side and the image-side surfaces of the first 410 through fifth lens element 450 are consisted of the aspheric formulas (1), and the aspheric coefficients are shown in Table 8. The lens structure of the fourth embodiment is similar with the ones of the first embodiment, so we will not go further on this issue here.

In the fourth embodiment, a focus length f1 of the first lens element 410 is 2.173 mm, a focal length f of the five-piece lens assembly for capturing images is 3.405 mm, A distance T45 between the image-side surface 444 of the fourth lens element and the object-side surface 452 of the fifth lens element on the optical axis is 0.650 mm. a value of the aperture stop of the five-piece lens assembly for capturing images is F=2.4, the entrance pupil diameter EPD is 1.419 mm, a distance OT between the object-side surface 412 and image plane on the optical axis is 4.38 mm, a distance T12 between the first lens element 410 and the second lens element 420 on the optical axis is 0.0609 mm, a central thickness of the first lens element 410 on the optical axis is 0.620 mm, a central thickness of the second lens element 420 on the optical axis is 0.214 mm, and a central thickness CT3 of the third lens element 430 on the optical axis is 0.362 mm, and the distance S5H is less than 0.2 mm.

A distance perpendicular to the optical axis between an inflection point on the object-side surface 432 of the third lens element 430 which is nearest to the optical axis and the optical axis is HI=0.31 mm, a reference point is a perpendicular projection of the inflection point onto the optical axis, and a distance in parallel with the optical axis from the reference point to an axial point on the object-side surface 432 of the third lens element 430 is DR=0.0105 mm. A distance in parallel with the optical axis from the axial point to a maximum effective diameter position on the object-side surface 432 of the third lens element 430 is Sag31=−0.00487 mm. The image-side surface 454 of the fifth lens element 450 has one critical point crossing with a tangent plane vertical to the optical axis, and a distance perpendicular to the optical axis between the critical point and the optical axis is DC=1.048 mm.

According to above description, |f/f1|=1.567 is satisfied with 1.3≤|f/f1|≤2.0, T45/f=0.191 is satisfied with 0.13<T45/f<0.23, |Sag31|/CT3=0.0135 is satisfied with 0≤|Sag31|/CT3≤0.2, T12/f=0.0179 is satisfied with 0≤T12/f≤0.1, (CT2+T12)/CT1=0.443 is satisfied with 0.3≤(CT2+T12)/CT1≤0.7, DC/EPD=0.738 is satisfied with 0.5≤DC/EPD≤1, HI=0.31 mm is satisfied with 0 mm≤HI≤0.5 mm.

TABLE 7

Basic lens element data of the fourth embodiment

| Surface# | | Curvature radius (mm) | Thickness (mm) | Index (Nd) | Abbe# (Vd) | Focal length (mm) |
|---|---|---|---|---|---|---|
| Aperture stop | | ∞ | −0.216 | | | |
| First lens element | First Surface | 1.563 | 0.620 | 1.544 | 56.09 | 2.173 |
| | Second Surface | −4.228 | 0.061 | | | |
| Second lens element | Third Surface | −3.644 | 0.214 | 1.636 | 23.89 | −2.887 |
| | Fourth Surface | 3.836 | 0.224 | | | |
| Third lens element | Fifth Surface | 3.763 | 0.362 | 1.636 | 23.89 | 20.646 |
| | Sixth Surface | 5.064 | 0.280 | | | |
| Fourth lens element | Seventh Surface | −3.084 | 0.669 | 1.544 | 56.09 | 2.397 |
| | Eighth Surface | −0.989 | 0.649 | | | |
| Fifth lens element | Ninth Surface | −0.877 | 0.403 | 1.514 | 56.78 | −2.101 |
| | Tenth Surface | −5.337 | 0.1 | | | |
| Filter | Eleventh Surface | ∞ | 0.21 | 1.517 | 64.17 | |
| | Twelfth Surface | ∞ | 0.589 | | | |

TABLE 8

Aspheric coefficients of the fourth embodiment

| | Surface # | | | | |
|---|---|---|---|---|---|
| | 1 | 2 | 3 | 4 | 5 |
| k | 2.127 | 0 | 5.149 | 0 | 0 |
| A | −0.090 | 0.244 | 0.379 | 0.091 | −0.277 |
| B | 0.248 | −0.314 | −0.511 | −0.443 | 0.404 |
| C | −2.679 | −0.745 | −0.369 | 1.898 | −1.801 |
| D | 10.686 | 5.005 | 5.050 | −4.040 | 4.494 |
| E | −23.348 | −12.922 | −14.520 | 4.326 | −5.557 |
| F | 25.738 | 14.767 | 17.237 | −2.216 | 3.554 |
| G | −11.720 | −6.195 | −7.267 | 0.453 | −0.972 |
| H | 0 | 0 | 0 | 0 | 0 |
| J | 0 | 0 | 0 | 0 | 0 |

| | Surface # | | | | |
|---|---|---|---|---|---|
| | 6 | 7 | 8 | 9 | 10 |
| k | 0 | −87.570 | −0.612 | −2.447 | 0 |
| A | −0.145 | −0.350 | 0.154 | 0.266 | 0.203 |
| B | 0.330 | 1.095 | −0.046 | −0.255 | −0.186 |
| C | −1.086 | −1.581 | 0.299 | 0.109 | 0.092 |
| D | 1.863 | 1.293 | −0.329 | −0.018 | −0.030 |
| E | −1.816 | −0.649 | 0.161 | $1.467*10^{-3}$ | $5.886*10^{-3}$ |
| F | 1.049 | 0.190 | −0.038 | $9.845*10^{-4}$ | $-6.628*10^{-4}$ |
| G | −0.267 | −0.025 | $3.773*10^{-3}$ | 0 | 0 |
| H | 0 | 0 | 0 | 0 | 0 |
| J | 0 | 0 | 0 | 0 | 0 |

Figure 5B:
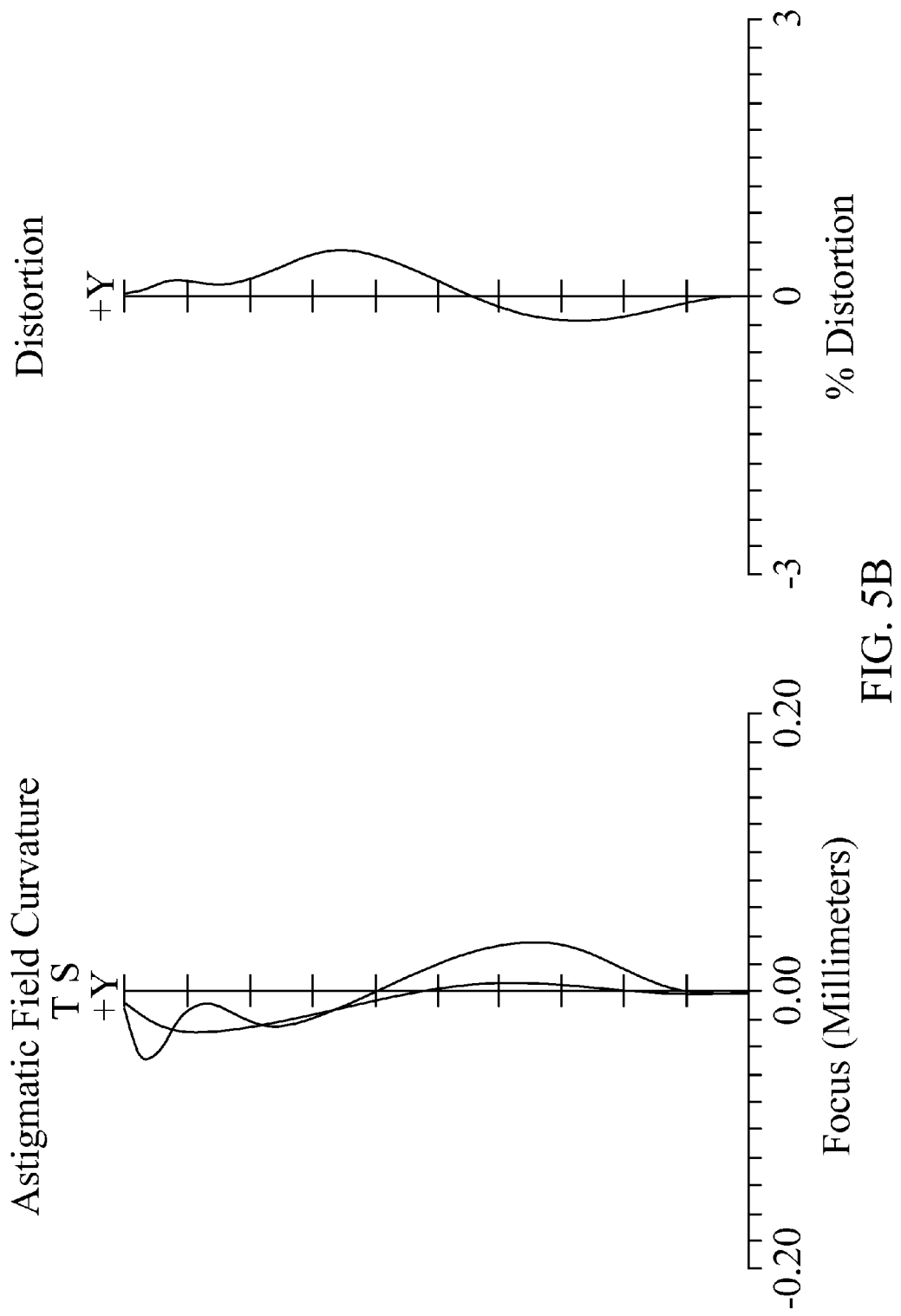
FIG. 5B is astigmatic field curves and a distortion curve according to the fourth embodiment of the present application.
Figure 5C:
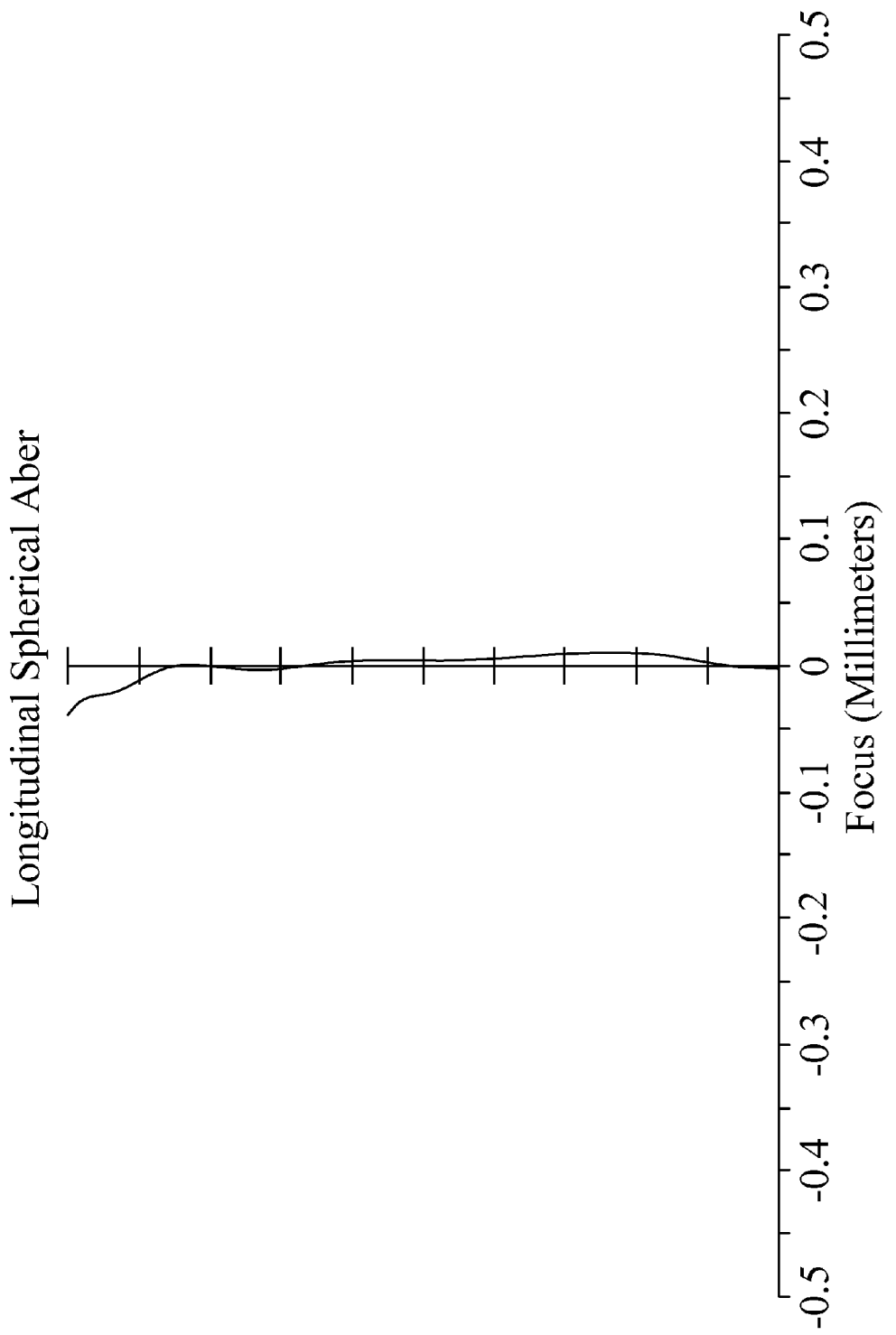
FIG. 5C is longitudinal spherical aberration curves according to the fourth embodiment of the present application.

It can be found by the basic lens element data of table 7 along with the curve diagram of aberration of FIG. 5B that it has better compensation effect upon the astigmatic field curves, the distortion curves and the longitudinal spherical aberration curves by the embodiment of the five-piece lens assembly for capturing images according to the present invention.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An five-piece lens assembly for capturing images, in order from an object side toward an image side along an optical axis comprising:
   a first lens element with positive refractive power having a convex image-side surface and a convex object-side surface adjacent to the optical axis, and at least one of the image-side surface and the object-side surface of the first lens element being aspheric;
   a second lens element with refractive power having a concave image-side surface adjacent to the optical axis, and at least one of the image-side surface and the object-side surface of the second lens element being aspheric;
   a third lens element with refractive power, an image-side surface and an object-side surface of the third lens element being aspheric, and both of the object-side surface and the image-side surface of the third lens element having inflection points;
   a fourth lens element with refractive power having a concave object-side surface and a convex image-side surface adjacent to the optical axis; and
   a fifth lens element with refractive power having a concave object-side surface and a convex image-side surface adjacent to the optical axis, the image-side surface and the object-side surface of the fifth lens element being aspheric, and the object-side surface of the fifth lens element having at least one inflection point and the image-side surface of the fifth lens element having at least two inflection points;
   wherein focal lengths from the first through fifth lens elements are f1, f2, f3, f4, and f5, respectively, a focal length of the five-piece lens assembly for capturing images is f, a distance between the image-side surface of the fourth lens element and the object-side surface of the fifth lens element on the optical axis is T45, and they are satisfied with following condition:

$$1.3 \leq |f/f1| \leq 2.0 \text{ and}$$

$$0.13 < T45/f < 0.23.$$

2. The five-piece lens assembly for capturing images of claim 1, wherein the third lens element has a convex object-side surface and a concave image-side surface adjacent to the optical axis.

3. The five-piece lens assembly for capturing images of claim 2, wherein an aspheric area on the object-side surface of the third lens element takes the optical axis as a center and its diameter is less than an entrance pupil diameter EPD, a distance between a most prominent point perpendicular to a point of the optical axis and a most depressed point perpendicular to a point of the optical axis is less than 0.2 mm.

4. The five-piece lens assembly for capturing images of claim 3, wherein a distance perpendicular to the optical axis between an inflection point on the object-side surface of the third lens element which is nearest to the optical axis and the optical axis is HI and it is satisfied with following relation:

$$0 \text{ mm} \leq HI \leq 0.5 \text{ mm}.$$

5. The five-piece lens assembly for capturing images of claim 4, wherein a reference point is a perpendicular projection of the inflection point onto the optical axis, a distance in parallel with the optical axis from the reference point to an axial point on the object-side surface of the third lens element is DR, and they are satisfied with following relation:

$$0\ mm \leq DR \leq 0.15\ mm.$$

6. The five-piece lens assembly for capturing images of claim 5, wherein a distance in parallel with the optical axis from the axial point to a maximum effective diameter position on the object-side surface of the third lens element is Sag31, a central thickness of the third lens element on the optical axis is CT3, and they are satisfied with following relation:

$$0 \leq |Sag31|/CT3 \leq 0.2.$$

7. The five-piece lens assembly for capturing images of claim 1, wherein a distance between the image-side surface of the first lens element and the object-side surface of the second lens element on the optical axis is T12, and it is satisfied with following relation:

$$0 \leq T12/f \leq 0.1.$$

8. The five-piece lens assembly for capturing images of claim 1, wherein a distance between the first lens element and the second lens element on the optical axis is T12, a central thickness of the first lens element on the optical axis is CT1, a central thickness of the second lens element on the optical axis is CT2, and they are satisfied with following relation:

$$0.3 \leq (CT2+T12)/CT1 \leq 0.7.$$

9. The five-piece lens assembly for capturing images of claim 1, wherein the object-side surface of the second lens elements has at least one inflection point.

10. An five-piece lens assembly for capturing images, in order from an object side toward an image side along an optical axis comprising:
- a first lens element with positive refractive power having a convex object-side surface adjacent to the optical axis, and at least one of the image-side surface and the object-side surface of the first lens element being aspheric;
- a second lens element with refractive power having a concave image-side surface adjacent to the optical axis, and at least one of the image-side surface and the object-side surface of the second lens element being aspheric;
- a third lens element with refractive power, an image-side surface and an object-side surface of the third lens element being aspheric, and both of the object-side surface and the image-side surface of the third lens element having inflection points;
- a fourth lens element with refractive power having a concave object-side surface and a convex image-side surface adjacent to the optical axis; and
- a fifth lens element with refractive power, an image-side surface and an object-side surface of the fifth lens element being aspheric, and the object-side surface of the fifth lens element having at least one inflection point and the image-side surface of the fifth lens element having at least two inflection points;

wherein focal lengths from the first through fifth lens elements are f1, f2, f3, f4, and f5, respectively, a focal length of the five-piece lens assembly for capturing images is f, a distance between the image-side surface of the fourth lens element and the object-side surface of the fifth lens element on the optical axis is T45, and they are satisfied with following condition:

$$1.3 \leq |f/f1| \leq 2.0\ \text{and}$$

$$0.13 \leq T45/f < 0.23.$$

11. The five-piece lens assembly for capturing images of claim 10, wherein the image-side surface of the third lens has one critical point crossing with a tangent plane vertical to the optical axis.

12. The five-piece lens assembly for capturing images of claim 10, wherein an aspheric area on the object-side surface of the third lens element takes the optical axis as a center and its diameter is less than an entrance pupil diameter EPD, a distance between a most prominent point perpendicular to a point of the optical axis and a most depressed point perpendicular to a point of the optical axis is less than 0.2 mm.

13. The five-piece lens assembly for capturing images of claim 10, wherein a distance perpendicular to the optical axis between an inflection point on the object-side surface of the third lens element which is nearest to the optical axis and the optical axis is HI and it is satisfied with following relation:

$$0\ mm \leq HI \leq 0.5\ mm.$$

14. The five-piece lens assembly for capturing images of claim 13, wherein a reference point is a perpendicular projection of the inflection point onto the optical axis, a distance in parallel with the optical axis from the reference point to an axial point on the object-side surface of the third lens element is DR, and it is satisfied with following relation:

$$0\ mm \leq DR \leq 0.15\ mm.$$

15. The five-piece lens assembly for capturing images of claim 14, wherein a distance in parallel with the optical axis from the axial point to a maximum effective diameter position on the object-side surface of the third lens element is Sag31, a central thickness of the third lens element on the optical axis is CT3, and it is satisfied with following relation:

$$0 < |Sag31|/CT3 \leq 0.2.$$

16. The five-piece lens assembly for capturing images of claim 10, wherein a value of the aperture stop of the five-piece lens assembly for capturing images is F, and it is satisfied with following relation:

$$1.5 \leq F \leq 2.9.$$

17. The five-piece lens assembly for capturing images of claim 10, wherein the image-side surface of the fifth lens has one critical point crossing with a tangent plane vertical to the optical axis, a distance perpendicular to the optical axis between the critical point and the optical axis is DC, the entrance pupil diameter is EPD, and they are satisfied with following relation:

$$0.5 \leq DC/EPD \leq 1.$$

18. An five-piece lens assembly for capturing images, in order f from an object side toward an image side along an optical axis comprising:
- a first lens element with positive refractive power having a convex object-side surface adjacent to the optical axis, and at least one of the image-side surface and the object-side surface of the first lens element being aspheric;
- a second lens element with refractive power having a concave image-side surface adjacent to the optical axis, and at least one of the image-side surface and the object-side surface of the second lens element being aspheric;
- a third lens element with refractive power, an image-side surface and an object-side surface of the third lens element being aspheric, and both of the object-side surface and the image-side surface of the third lens element having inflection points;
- a fourth lens element with refractive power having a concave object-side surface and a convex image-side surface adjacent to the optical axis; and a fifth lens element with refractive power, an image-side surface and an object-side surface of the fifth lens element being aspheric, and the object-side surface of the fifth lens element having at least one inflection point and the image-side surface of the fifth lens element having at least two inflection points;

wherein focal lengths from the first through fifth lens elements are f1, f2, f3, f4, and f5, respectively, a focal length of the five-piece lens assembly for capturing images is f, a distance between the object-side surface of the first lens element and an image plane on the optical axis is OT, and they are satisfied with following condition:

$1.3 \leq |f/f1| \leq 2.0$ and $OT < 3.5$ mm.

19. The five-piece lens assembly for capturing images of claim 18, wherein an aspheric area on the object-side surface of the third lens element takes the optical axis as a center and its diameter is less than an entrance pupil diameter EPD, a distance between a most prominent point perpendicular to a point of the optical axis and a most depressed point perpendicular to a point of the optical axis is less than 0.2 mm.

20. The five-piece lens assembly for capturing images of claim 18, wherein a distance perpendicular to the optical axis between an inflection point on the object-side surface of the third lens element which is nearest to the optical axis and the optical axis is HI, and it is satisfied with following relation:

$0$ mm $\leq HI \leq 0.5$ mm.

* * * * *